MEMORY DEVICE

Filed Nov. 9, 1964

INVENTOR.
FRANCIS J. MURPHREE
BY
ATTORNEYS

United States Patent Office 3,388,268
Patented June 11, 1968

3,388,268
MEMORY DEVICE
Francis J. Murphree, Sunnyside, Fla., assignor to the United States of America as represented by the Secretary of the Navy
Filed Nov. 9, 1964, Ser. No. 410,034
11 Claims. (Cl. 307—238)

ABSTRACT OF THE DISCLOSURE

A memory device having an adjustable pulse generator for timely producing a storage pulse, a transistorized storage circuit for storing a data signal in response to said storage pulse, an adjustable pulse generator for timely producing an enable-reset pulse, a transistorized circuit for the clearing of said stored data signal in response to said enable-reset pulse, an adjustable readout pulse generator for timely producing a readout pulse, and a transistorized circuit for reading out the data signal from said transistorized storage circuit in response to the aforesaid readout pulse.

Figure 1:
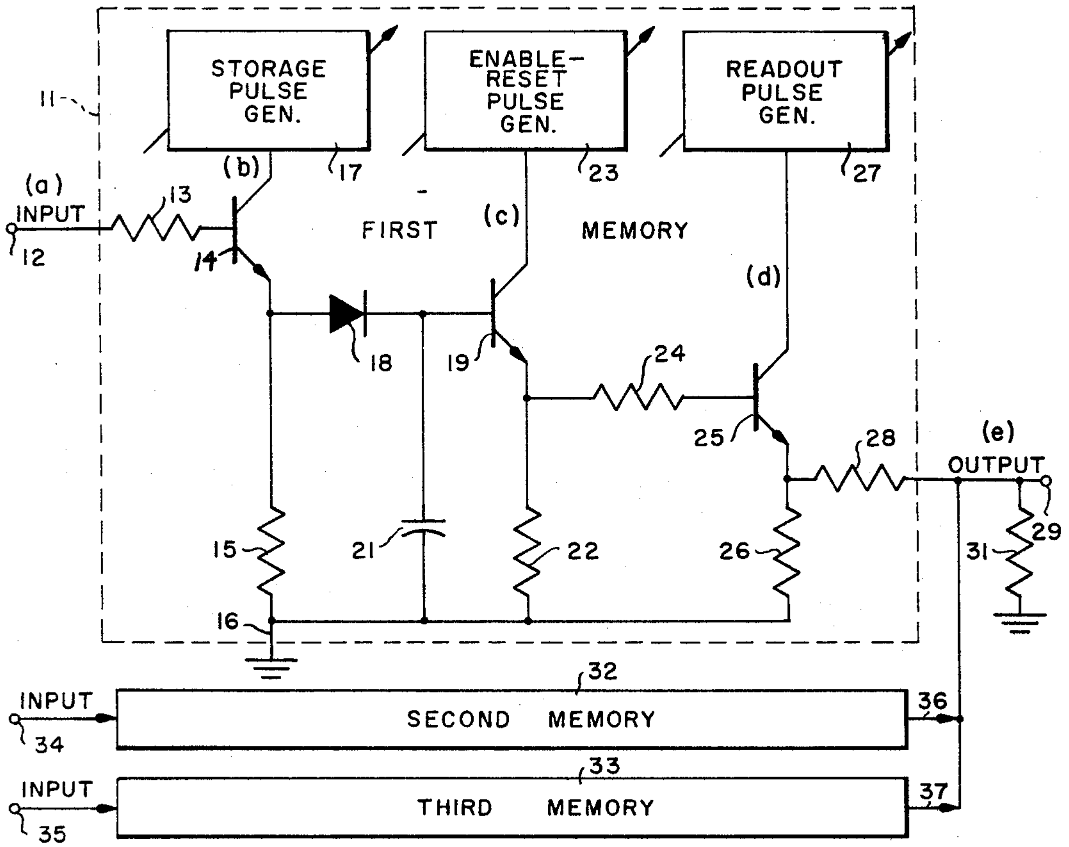

The invention described herein may be manufactured and used by or for the Government of the United States of America for governmental purposes without the payment of any royalties thereon or therefor.

The present invention relates to memory systems in general and in particular is an electronic memory circuit which is controllable by predetermined control pulses. In even more particular, it is an improved, versatile, transistorized memory device which has variable sampling rates, variable electrical data signal storing periods, variable capacities, and variable readout periods.

In the past, numerous prior art methods and means have been employed for timely storing electrical data signals. For instance, it is well known to use such means as tape recorders, Deltics, and magnetic core devices. And, as a matter of fact, several memory systems incorporating transistorized electrical circuits are known to perform certain data storage functions of value under certain operational circumstances; hence, for many practical purposes, the memory devices of the prior art have proven to be eminently satisfactory. However, in most instances, they leave a great deal to be desired because they are complex of structure and circuitry; expensive to manufacture, maintain, and operate; sometimes requires considerable ancillary power and other associated equipment in order to function properly; and the adjustability and controllability thereof is usually insufficient, less reliable, and less accurate for many contemporary applications.

Because devices comparable to the present invention have many important applications, including calculating machines, automatic telephony equipment, electronic computers, and automatic mapping systems, it is definitely desirable that they have optimum performance characteristics for any given intended use. And inasmuch as the present invention overcomes most of the aforementioned disadvantages of the prior art devices, it constitutes a considerable improvement thereover for many practical purposes.

It is, therefore, an object of this invention to provide an improved memory system.

Another object of this invention is to provide an improved method and means for effecting the storage and readout of electrical data signals.

Still another object of this invention is to provide a memory system having variable and adjustable sampling rates.

A further object of this invention is to provide a memory system having a variable and adjustable storage capacity.

A further object of this invention is to provide a memory system having variable and adjustable readout periods.

Another object of this invention is to provide a memory device that stores substantially the amplitude of an input data signal.

Another object of this invention is to provide a memory system having relatively simple structure and electrical circuitry.

Still another object of this invention is to provide a memory circuit that is relatively small and compact in size for its operational characteristics and is, therefore, less burdensome than prior art devices of comparable function.

Still another object of this invention is to provide an improved electrical data signal storage and memory system that is easily and economically manufactured, operated, and maintained.

Figure 2:
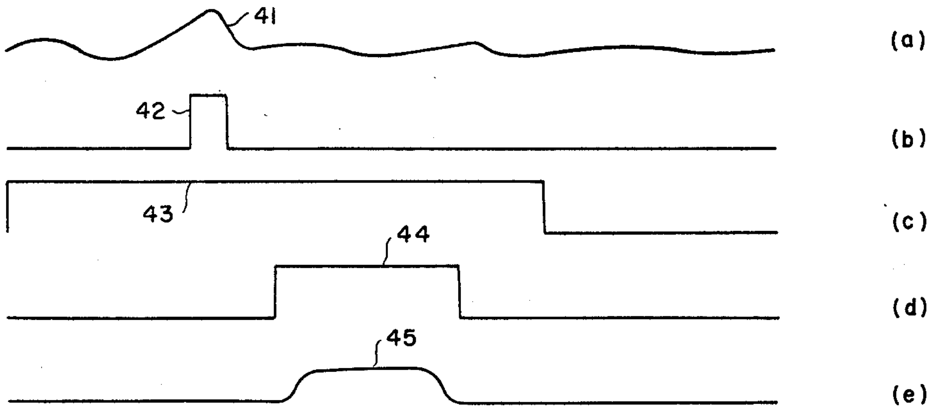

Other objects and many of the attendant advantages will be readily appreciated as the subject invention becomes better understood by reference to the following detailed description when considered in conjunction with the accompanying drawing wherein:

FIG. 1 is a combination schematic and block diagram of the memory system constituting this invention; and FIG. 2 is a graphical representation of various and sundry signals occurring at certain locations in the subject invention at any given instant.

Referring now to FIG. 1, there is shown a first memory system 11 having an input terminal 12 to which the electrical data signal to be stored is applied. Terminal 12 is coupled through a 47,000 ohm resistor 13 to the base of a 2N335 transistor 14. The emitter of transistor 14 is coupled through a 1,000 ohm resistor 15 to a ground 16, and the collector thereof is connected to the output of an adjustable storage pulse generator 17. It is noteworthy here that the resistance of resistor 13 should be greater than that of resistor 15 for reasons which will be further explained in the discussion of the operation of the invention presented subsequently.

The emitter of transistor 14 is also connected through a 1N458 diode 18 to the base of a 2N335 transistor 19, and the base thereof is coupled through a 0.47 mfd. electrical data signal storage capacitor 21. The emitter of transistor 19 is connected through a 4,700 ohm resistor 22 to ground, and the collector thereof is connected to the output of an adjustable enable-reset pulse generator 23.

The emitter of transistor 19 is also coupled through a 47,000 ohm resistor 24 to the base of a 2N335 transistor 25. The emitter of transistor 25 is coupled through a 1,000 ohm resistor 26 to ground, and the collector thereof is connected to the output of an adjustable readout pulse generator 27. The emitter of transistor 25 is coupled through a 10,000 ohm resistor 28 to an output terminal 29, which, of course, constitutes the output of the subject invention.

A load regulating and stabilizing resistor 31 having of the order of 1,000 ohms resistance is optionally connected between the aforesaid output of the invention and ground.

The aforesaid storage pulse generator 17, enable-reset pulse generator 23, and readout pulse generator 27 are conventional per se and may each be selected from any of many well known suitable pulse generator types which produce substantially squarewave type of output waveforms. For example, generators 17, 23, and 27 may be selected from the appropriate multivibrator art and, if desired, may actually be any suitable plurality of bistable multivibrators having the proper design to respectively produce output pulses having pertinent waveform characteristics. Of course, for optimum operation and application, furthermore, said generators should be of the adjustable type which allows the time of occurrence, amplitude, shape, and duration of their respective output pulses to be varied as desired for any given operational circumstances.

Second and third memory systems 32 and 33, which are similar to memory 11, may optionally be used in conjunction with the aforementioned memory system 11, if so desired. Said memory systems 32 and 33 have inputs 34 and 35 and outputs 36 and 37, respectively. Said inputs are likewise intending to receive the data signals to be stored, and the outputs thereof may be electrically connected to the output of memory system 11, in event a single overall output is preferred.

The operation of the instant invention will now be discussed briefly as follows:

A typical input signal is graphically represented in FIG. 2(*a*). It contains a portion thereof which, due to subsequently discussed control measures, will be stored in the storage element of the invention. This input signal is applied through resistor 13 to the base of transistor 14, and when the collector thereof is at zero voltage, very little data signal voltage is developed across resistor 15. Since resistor 13 has greater resistance than resistor 15, the base-emitter potential difference is such that transistor 14 effectively becomes an unbiased diode, and, thus, provides an exceedingly low impedance in the forward direction. Application of a predetermined voltage to the collector of transistor 14 causes it to timely conduct and act as an emitter follower of high input impedance, and, of course, when this occurs, almost the entire data signal voltage appears across resistor 15. Therefore, it may readily be seen that if a voltage having a waveform substantially comparable to that shown in FIG. 2(*b*) is applied to the collector of transistor 14 by storage pulse generator 17, the data signal appears across resistor 15 at the time pulse 42 thereof occurs. In this particular instance, that data signal happens to be the aforementioned signal portion 41, but it obviously could and would be some other portion thereof if pulse 42 occurred at some other time. The manual or other adjustment of storage pulse generator 17, as necessary to meet the operational requirements of any given application of this invention, would, of course, cause pulse 42 to occur at some other preferred time and perhaps for some other preferred duration.

The data signal voltage that appears across resistor 15 charges capacitor 21 through diode 18, and most of the voltage across capacitor 21 appear across resistor 22 if and when the proper voltage is applied to the collector of transistor 19 by enable reset pulse generator 23, so as to timely make it conduct. Said proper collector voltage may, for example, take the form of the waveform of FIG. 2(*c*), depending on the manual or other adjustment of enable-reset pulse generator 23, and the enabling-reset pulse 43 thereof, in this particular instance, is the portion that causes transistor 19 to act as a high input impedance emitter follower during the storage-readout cycle. Capacitor 21 is preferably made large enough so that the time constant resulting from the parallel arrangement of capacitor 21 and the input impedance of transistor 19 and the back resistance of diode 18 in series therewith is large compared to the readout period, so that the voltage ultimately read out is approximately equal to that read in. Actually, the voltage across resistor 26 is very small until the readout pulse is applied to the collector of transistor 25 by adjustable readout pulse generator 27, since resistor 24 interconnecting the emitter of transistor 19 and the base of transistor 25 has been designed to have greater resistance than resistor 26. But when the proper voltage, such as that depicted as readout voltage 44 in the wave form of FIG. 2(*d*) is timely applied to the collector of transistor 25, transistor 25 conducts and likewise acts as an emitter follower, allowing resistor 26 to be effectively coupled in parallel with capacitor 21 and resistor 22 and substantially acquire the voltage thereacross for the duration of the readout period. Of course, when this occurs, the voltage across resistor 26 is coupled across resistor 28 to become the data signal output.

At the end of the readout cycle, as seen from FIG. 2(*c*), the enable-reset pulse amplitude drops to zero. This, in turn, causes the input impedance of transistor 19 to drop to a low value and, hence, causes the base-emitter path thereof to effectively become a low resistance diode-type path, thereby allowing capacitor 21 to discharge therethrough and reset or prepare the memory circuit for the next readin-readout cycle.

For reference load voltage stabilization purposes, resistor 31 is optionally connected between the output of the memory devices and ground and, thus, it, too, may have some effect in shaping the waveform of the memory output. Typically, however, the output signal from the memory device will be comparable to that shown in FIG. 2(*e*), and the stored data signal portion thereof may, for example, assume the form of pulse 45 thereof.

As is shown in FIG. 1 and as previously suggested above, a plurality of memories, such as memories 11, 32, and 33, may be connected as a bank of memories and in such manner as to have the same output terminal. The individual memories of said bank of memories may each include its own timing and control pulse generators which respectively produce timing and control pulses that are similar to or different from those produced by generators 17, 23, and 27 of memory 11.

In summary, the control pulse from storage pulse generator 17 causes transistor 14 to conduct for its pulse period and store the data signal in capacitor 21. If transistor 19 is enabled at that time as a result of the pulse from enable-reset generator being applied thereto, both readin and readout of the stored data is possible. When the readout pulse is then applied to transistor 25 by readout pulse generator 27, readout of the stored data signal occurs for the duration of the readout pulse period. After readout, the memory capacitor is discharged and reset and thus made ready for another input data signal to be stored. This occurs as a result of the enable-reset pulse amplitude going to zero which, of course, causes transistor 19 to become nonconductive in the normal operational sense and provide a diode-type low resistance discharge path across capacitor 21.

Accordingly, it may be seen that complete control of the storage and readout of a data signal is facilitated in an optimum manner.

Obviously, many modifications and other embodiments of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A memory system for timely reading in, storing, and reading out an electrical data signal comprising in combination, an adjustable storage pulse generator, a first transistor having a base, an emitter, and a collector with the base thereof adapted for receiving the data signal to be stored and with the collector thereof coupled to the output of said adjustable storage pulse generator, a ground, first resistance means connected between the emitter of said first transistor and said ground, an adjustable enable-reset pulse generator, a second transistor having a base, an emitter, and a collector, with the collector thereof coupled to the output of said adjustable enable-reset pulse generator, a diode connected between the base of said second transistor and the emitter of said first transistor, a capacitance means connected between the base of said second transistor and said ground, second resistance means coupled between the emitter of said second transistor and said ground, an adjustable readout pulse generator, a third transistor having a base, an emitter, and a collector, with the collector thereof connected to the output of said adjustable readout pulse generator and the emitter thereof adapted for being the output of the subject memory system, third resistance means connected between the emitter of said second transistor and the base of said third transistor, and a fourth resistance means connected between the emitter of said third transistor and the aforesaid ground.

2. The invention of claim 1 further characterized by an input terminal, and a fifth resistance means interconnecting said input terminal and the base of the aforesaid first transistor.

3. The invention of claim 2 further characterized by an output terminal, and a sixth resistance means interconnecting said output terminal and the emitter of the aforesaid third transistor.

4. The invention of claim 3 further characterized by a seventh resistance means effectively interconnecting said output terminal and the aforesaid ground.

5. A memory system comprising in combination, an input terminal adapted for receiving a data signal to be stored, a first transistor having a base, an emitter, and a collector, a first resistor interconnecting said input terminal and the base of said first transistor, a storage pulse generator with the output thereof coupled to the collector of said first transistor, a ground, a second resistor interconnecting the emitter of said first transistor and said ground, a second transistor having a base, an emitter, and a collector, a diode interconnecting the emitter of said first transistor and the base of said second transistor, a capacitor interconnecting the base of said second transistor and said ground, an enable-reset pulse generator with the output thereof coupled to the collector of said second transistor, a third resistor interconnecting the emitter of said second transistor and said ground, a third transistor having a base, an emitter and a collector, a fourth resistor interconnecting the emitter of said second transistor and the base of said third transistor, a readout pulse generator with the output thereof coupled to the collector of said third transistor, a fifth resistor interconnecting the emitter of said third transistor and said ground, an output terminal, and a sixth resistor interconnecting said output terminal and the emitter of the aforesaid third transistor.

6. The device of claim 5 wherein said diode interconnects the emitter of said first transistor and the base of said second transistor in such manner that current will flow therethrough only in the direction toward the aforesaid capacitor.

7. The invention according to claim 5 further characterized by a resistor interconnecting said output terminal and said ground.

8. An electronic memory system for timely sampling, storing, and reading out an electrical data signal consisting of, an input terminal adapted for receiving a data signal to be stored, a first transistor having a base, an emitter, and a collector, a first resistor interconnecting said input terminal and the base of said first transistor, a storage pulse generator with the output thereof coupled to the collector of said first transistor, a ground, a second resistor interconnecting the emitter of said first transistor and said ground, a second transistor having a base, an emitter, and a collector, a diode interconnecting the emitter of said first transistor and the base of said second transistor, a capacitor interconnecting the base of said second transistor and said ground, an enable-reset pulse generator with the output thereof coupled to the collector of said second transistor, a third resistor interconnecting the emitter of said second transistor and said ground, a third transistor having a base, an emitter and a collector, a fourth resistor interconnecting the emitter of said second transistor and the base of said third transistor, a readout pulse generator with the output thereof coupled to the collector of said third transistor, a fifth resistor interconnecting the emitter of said third transistor and said ground, an output terminal, and a sixth resistor interconnecting said output terminal and the emitter of the aforesaid third transistor.

9. The invention according to claim 8 further characterized by a resistor interconnecting said output terminal and said ground.

10. A memory bank adapted for timely receiving a plurality of input data signals, timely storing said data signals, and timely reading out said data signals at a unitary output comprising in combination, a plurality of input terminals adapted for receiving a like plurality of data signals to be stored, respectively, an output terminal adapted for timely supplying a plurality of data signals subsequent to their storage, a plurality of memory circuits respectively connected between said plurality of input terminals and the aforesaid output terminal each of which comprises, a first transistor having a base, an emitter, and a collector, a first resistor interconnecting one of said plurality of input terminals and the base of said first transistor, a storage pulse generator with the output thereof coupled to the collector of said first transistor, a ground, a second resistor interconnecting the emitter of said first transistor and said ground, a second transistor having a base, an emitter, and a collector, a diode interconnecting the emitter of said first transistor and the base of said second transistor, a capacitor interconnecting the base of said second transistor and said ground, an enable-reset pulse generator with the output thereof coupled to the collector of said second transistor, a third resistor interconnecting the emitter of said second transistor and said ground, a third transistor having a base, an emitter, and a collector, a fourth resistor interconnecting the emitter of said second transistor and the base of the said third transistor, a readout pulse generator with the output thereof coupled to the collector of said third transistor, a fifth resistor interconnecting the emitter of said third transistor, and a sixth resistor interconnecting said output terminal and the emitter of the aforesaid third transistor.

11. The invention according to claim 10 further characterized by another resistor connected between said output terminal and ground.

References Cited

UNITED STATES PATENTS

| | | | |
|---|---|---|---|
| 3,026,427 | 3/1962 | Chisholm ---------- | 307—88.5 |
| 3,082,332 | 3/1963 | Smeltzer et al. ------ | 307—88.5 |
| 3,171,980 | 3/1965 | Colao et al. --------- | 307—88.5 |
| 3,231,763 | 1/1966 | Mellott ------------ | 307—88.5 |

JOHN S. HEYMAN, *Primary Examiner.*